US008719551B2

(12) United States Patent
Nishida

(10) Patent No.: US 8,719,551 B2
(45) Date of Patent: May 6, 2014

(54) PROCESSOR WITH ARBITER SENDING SIMULTANEOUSLY REQUESTED INSTRUCTIONS FROM PROCESSING ELEMENTS IN SIMD / MIMD MODES

(75) Inventor: Hideshi Nishida, Hyogo (JP)

(73) Assignee: Panasonic Corporation, Osaka (JP)

( * ) Notice: Subject to any disclaimer, the term of this patent is extended or adjusted under 35 U.S.C. 154(b) by 418 days.

(21) Appl. No.: 13/265,172

(22) PCT Filed: Apr. 15, 2010

(86) PCT No.: PCT/JP2010/002734
§ 371 (c)(1),
(2), (4) Date: Oct. 19, 2011

(87) PCT Pub. No.: WO2010/122746
PCT Pub. Date: Oct. 28, 2010

(65) Prior Publication Data
US 2012/0036336 A1 Feb. 9, 2012

(30) Foreign Application Priority Data

Apr. 22, 2009 (JP) ................................ 2009-103567

(51) Int. Cl.
G06F 9/38 (2006.01)
G06F 13/14 (2006.01)

(52) U.S. Cl.
USPC .............................. 712/20; 710/240; 712/215

(58) Field of Classification Search
CPC ... G06F 9/3885; G06F 9/3851; G06F 9/3887; G06F 9/3889; G06F 9/38
See application file for complete search history.

(56) References Cited

U.S. PATENT DOCUMENTS 3,229,260 A * 1/1966 Falkoff ........................ 712/214

(Continued)

FOREIGN PATENT DOCUMENTS

JP 3-211656 9/1991

(Continued)

OTHER PUBLICATIONS

International Search Report issued May 18, 2010 in International (PCT) Application No. PCT/JP2010/002734.

Primary Examiner — Kenneth Kim
(74) Attorney, Agent, or Firm — Wenderoth, Lind & Ponack, L.L.P.

(57) ABSTRACT

The present invention provides an information processing apparatus and an integrated circuit which realize parallel execution of different processing systems, and which do not require the provision of a dedicated memory storing instructions for common processing The information processing apparatus comprises: a plurality of processor elements; an instruction memory storing a first program and a second program; and an arbiter interposed between the processor elements and the instruction memory, the arbiter receiving, from each of the processor elements, a request for an instruction, from among instructions included in the first program and the second program, and controlling access to the instruction memory by the processor elements, wherein the arbiter arbitrates requests made by the processor elements when the requests are (i) simultaneous requests for different instructions included in one of the first program and the second program or (ii) simultaneous requests for an instruction included in the first program and an instruction included in the second program, and when two or more of the processor elements simultaneously request a same instruction included in one of the first program and the second program, the arbiter, when judging that the instruction memory is available to the two or more processor elements, outputs the same instruction to the two or more processor elements.

8 Claims, 11 Drawing Sheets

(56) References Cited

U.S. PATENT DOCUMENTS

| | | | |
|---|---|---|---|
| 5,471,592 A | 11/1995 | Gove et al. | |
| 5,535,410 A | 7/1996 | Watanabe et al. | |
| 5,592,405 A | 1/1997 | Gove et al. | |
| 5,606,520 A | 2/1997 | Gove et al. | |
| 5,696,913 A | 12/1997 | Gove et al. | |
| 7,032,099 B1 * | 4/2006 | Imamura | 712/29 |
| 7,237,071 B2 * | 6/2007 | Jahnke | 711/150 |
| 2004/0133765 A1 | 7/2004 | Tanaka et al. | |
| 2009/0049275 A1 | 2/2009 | Kyo | |
| 2011/0047348 A1 | 2/2011 | Kyo | |
| 2011/0138151 A1 | 6/2011 | Kyo | |

FOREIGN PATENT DOCUMENTS

| | | |
|---|---|---|
| JP | 6-68053 | 3/1994 |
| JP | 7-141304 | 6/1995 |
| JP | 3199205 | 6/2001 |
| JP | 2004-171530 | 6/2004 |
| JP | 2008-77151 | 4/2008 |
| WO | 2008/023576 | 2/2008 |

* cited by examiner

PROCESSOR WITH ARBITER SENDING SIMULTANEOUSLY REQUESTED INSTRUCTIONS FROM PROCESSING ELEMENTS IN SIMD / MIMD MODES

TECHNICAL FIELD

The present invention relates to a technology of controlling access to programs which are to be executed in parallel by processor elements.

DESCRIPTION OF THE RELATED ART

SIMD (Single Instruction Multi Data) parallel processors are used in LSIs, which are incorporated in TVs, recorders, digital video cameras, mobile phones and the like. SIMD processors perform parallel processing of data included in video codec and image processing, and have an advantage of reducing operation frequency. Commonly, a SIMD parallel processor is capable of performing common processing with respect to multiple pieces of data in response to a single instruction stream. Accordingly, by allocating each of processor elements composing the SIMD parallel processor to a single pixel, common processing can be performed simultaneously with respect to multiple pixels in an image. Further, by increasing the number of processor elements composing the SIMD parallel processor, a larger number of pixels can be processed concurrently, and thus, a reduction in operation frequency can be realized.

However, currently in the field of video codec, minimization is taking place of the units in which data are processed, for the sake of improving compression ratio. To provide an example, minimal reference units of luminous intensity information during motion compensation is 16×8 pixels under MPEG-2, but under H.264, motion compensation is performed with respect to minimal reference units of 4×4 pixels. Therefore, a limitation is imposed on the concurrency of processing of SIMD parallel processors by the units of processing, and concurrency cannot be easily improved by providing an increased number of processor elements.

When attempting to perform processing by applying only a SIMD processing system, a necessity arises of performing complex rearrangement of data prior to the processing, and a complex program structure is required as well. In view of such technical problems of the SIMD processing system, proposals have been made of methods of performing dynamic switching between the SIMD processing system and a MIMD (Multi Instruction Multi Data) processing system (for instance, refer to Patent Literatures 1 and 2).

In the technology disclosed in Patent Literatures 1 and 2, dynamic switching between the SIMD processing system and the MIMD processing system is realized by providing switches between an instruction memory storing a program that executes SIMD processing (hereinafter referred to as an SIMD program) and an instruction memory storing a program that executes MIMD processing (hereinafter referred to as an MIMD program), and multiple processor elements.

CITATION LIST

Patent Literature

[Patent Literature 1]
Japanese Patent Application Publication No. 03-211656
[Patent Literature 2]
Japanese Patent No. 3199205

SUMMARY OF INVENTION

Technical Problem

In conventional technology, in a processing system where the multiple processor elements are MIMD processor elements, each of the MIMD processor elements executes processing on an individual basis. As such, one instruction memory (individual memory) that stores a program to be executed is allocated to each of the MIMD processor elements.

Further, there is a demand for performing SIMD processing and MIMD processing in parallel by provision of both the SIMD processing system and the MIMD processing system. In other words, there is a demand for enabling a certain proportion of processor elements among multiple processor elements to simultaneously execute common processing. When applying the technology disclosed in Patent Literatures 1 and 2, the above can be realized by separately preparing another instruction memory (dedicated memory) storing an instruction (SIMD processing instruction) for common processing, and reconnecting the processor elements to the dedicated memory from the individual memories with the use of a switch when it is desired to cause the processor elements to execute common processing.

However, the provision of a dedicated memory, which stores the SIMD processing instruction, for realizing parallel execution of the SIMD processing and the MIMD processing is problematic in that an increase of cost is brought about.

In view of such problems, the present invention provides an information processing apparatus and an integrated circuit which realize parallel execution of different processing systems, and which do not require the provision of a dedicated memory storing the instructions for common processing.

Solution to the Problems

In view of the above-mentioned problems, the present invention provides an information processing apparatus comprising: a plurality of processor elements; an instruction memory storing a first program and a second program; and an arbiter interposed between the processor elements and the instruction memory, the arbiter receiving, from each of the processor elements, a request for an instruction, from among instructions included in the first program and the second program, and controlling access to the instruction memory by the processor elements, wherein the arbiter arbitrates requests made by the processor elements when the requests are (i) simultaneous requests for different instructions included in one of the first program and the second program or (ii) simultaneous requests for an instruction included in the first program and an instruction included in the second program, and when two or more of the processor elements simultaneously request a same instruction included in one of the first program and the second program, the arbiter, when judging that the instruction memory is available to the two or more processor elements, outputs the same instruction to the two or more processor elements.

Advantageous Effects of the Invention

According to this, the first program and the second program are stored in a single instruction memory, and access control of the processor elements is performed by the arbiter. Hence, each of the multiple processor elements is able to access an execution target program, while there being no need to provide separate instruction memories storing each of the first program and the second program as in conventional technology.

DESCRIPTION OF EMBODIMENT

Embodiment 1

In the following, description is provided on an information processing apparatus pertaining to the present embodiment with reference to the accompanying drawings.

1.1 Structure of Information Processing Apparatus 100

Here, explanation is provided of a general outline and a structure of an information processing apparatus 100.

Figure 1:
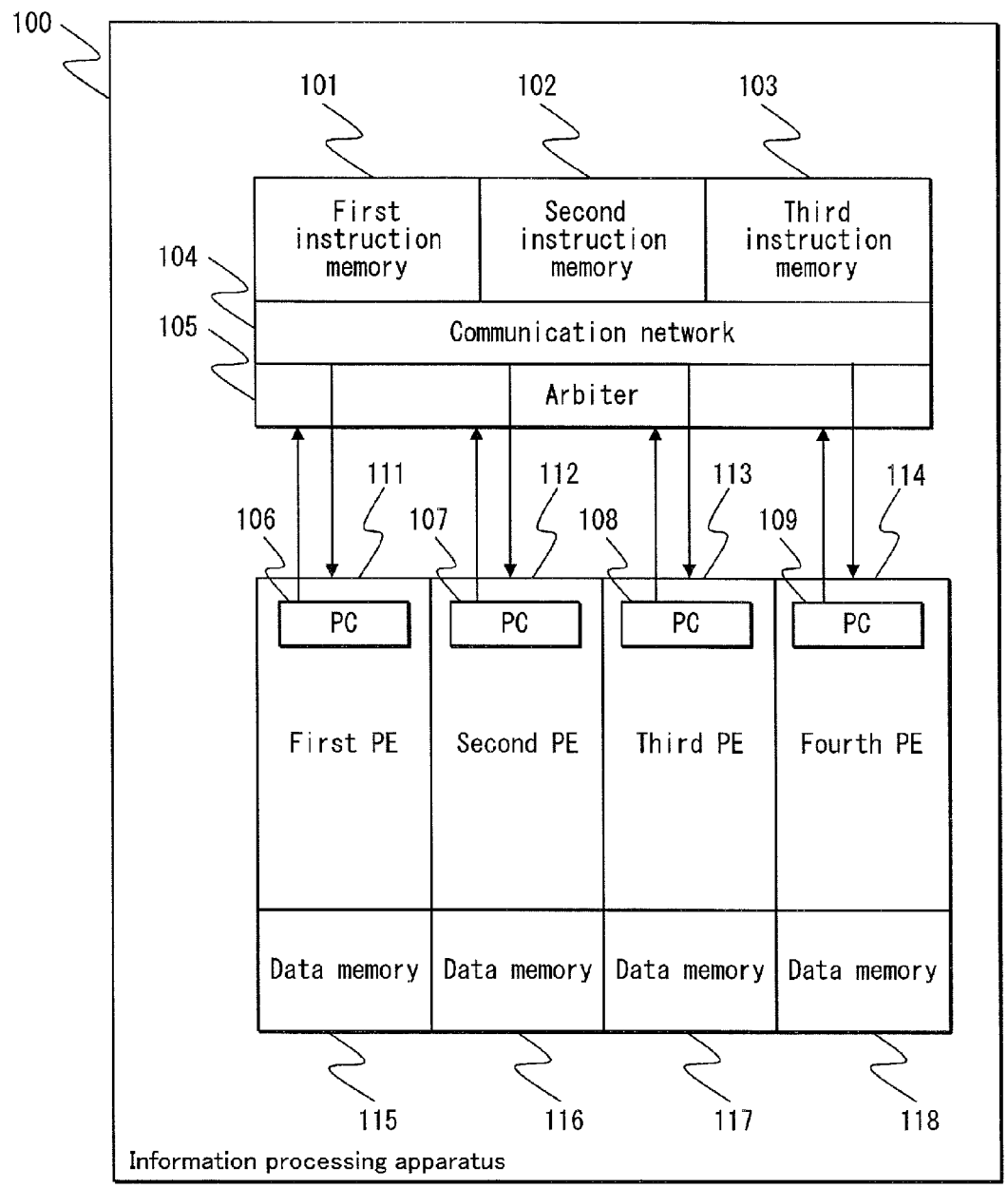
FIG. 1 is a block diagram illustrating a structure of an information processing apparatus 100.

As depicted in FIG. 1, the information processing apparatus 100 includes: a first instruction memory 101; a second instruction memory 102; a third instruction memory 103; a communication network 104; an arbiter 105; a first processor element (PE) 111; a second PE 112; a third PE 113; a fourth PE 114; a data memory 115; a data memory 116; a data memory 117; and a data memory 118. The information processing apparatus 100 is, for instance, a parallel processor including such components.

(1) The First Instruction Memory 101, the Second Instruction Memory 102, and the Third Instruction Memory 103

Figure 2:
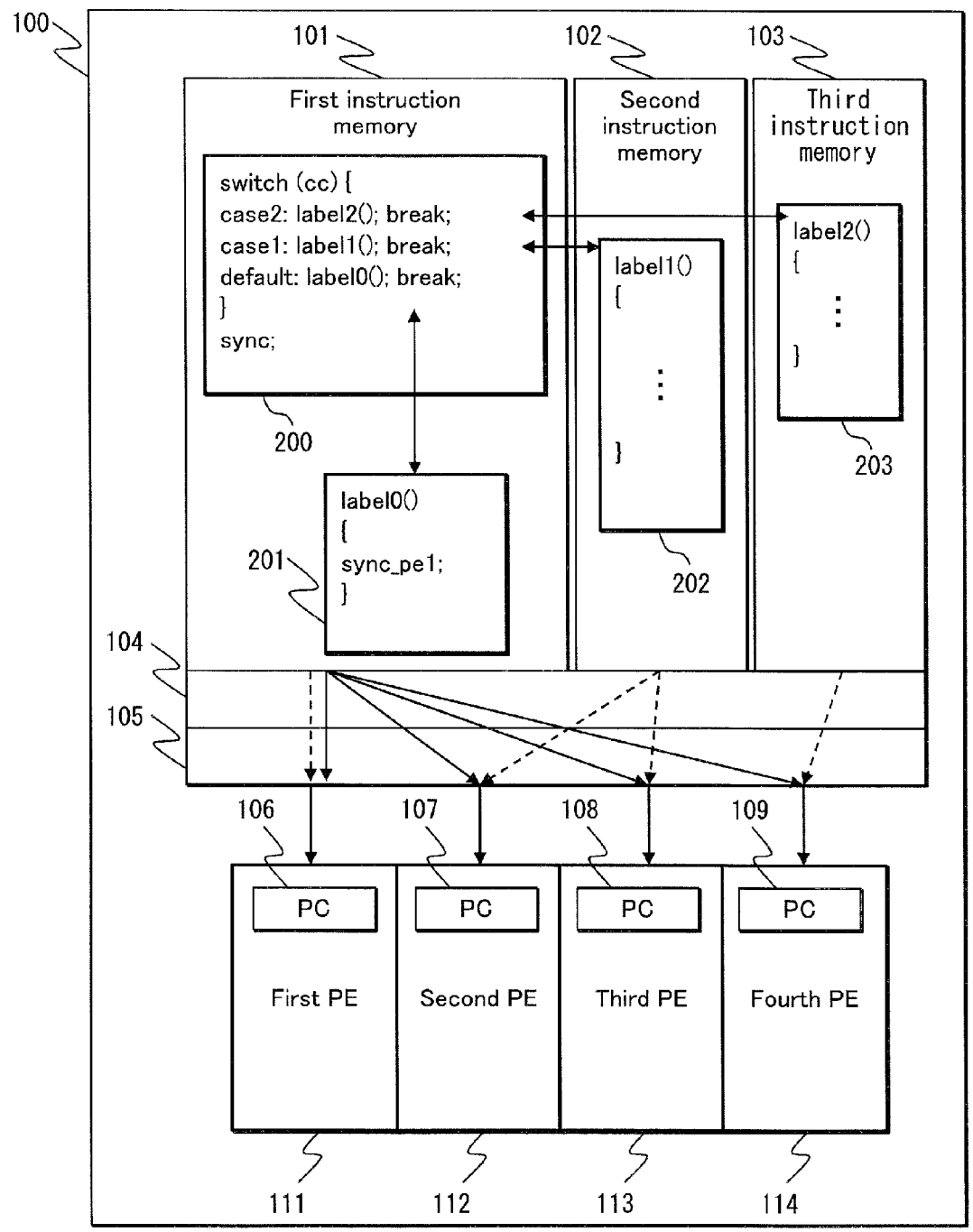
FIG. 2 is a diagram illustrating an example of a program having a first instruction memory 101, a second instruction memory 102, and a third instruction memory 103 stored therein.

As illustrated in FIG. 2, the first instruction memory 101 stores an SIMD program 200 and an MIMD program 201.

Similarly, as illustrated in FIG. 2, the second instruction memory 102 stores an MIMD program 202, and the third instruction memory 103 stores an MIMD program 203.

The SIMD program 200 includes an instruction for processing to be commonly executed by the first PE 111-the fourth PE 114. On the other hand, the MIMD programs 201-203 each include an instruction for a respective type of processing. The PEs, by each simultaneously executing one of the MIMD programs, are able to process multiple, different pieces of data in parallel.

For instance, when the information processing apparatus performs image processing and the macroblocks to be processed include different types of macroblocks, a high degree of concurrency is not achieved when performing SIMD processing. This is since SIMD processing is executed with respect to comparatively small units of processing. This problem is resolved by allocating the MIMD programs 201-203 to processing of marcoblock units of different types. Accordingly, programs for processing different macroblock types are executed concurrently.

(2) The Data Memories 115-118

The data memories 115-118 are respectively allocated to the first PE 111-the fourth PE 114. For example, the data memory 115 is allocated to the first PE 111, and the data memory 116 is allocated to the second PE 112.

Further, the data memories 115-118 each store data to be processed by the corresponding one of the PEs.

(3) The First PE 111-the Fourth PE 114

Each of the first PE 111-the fourth PE 114 performs processing with respect to data stored in the corresponding one of the data memories 115-118.

Further, the first PE 111-the fourth PE 114 respectively include program counters (PCs) 106-109. The first PE 111-the fourth PE 114 each perform processing with respect to data stored in the corresponding one of the data memories 115-118 by reading out an instruction of one of the programs stored in the instruction memories 101-103 according to a value of the corresponding program counter, and by executing the instruction so read out.

(4) The Arbiter 105

The arbiter 105 receives requests for instructions of programs stored in the instruction memories 101-103 from the PEs 111-114, and when conflict of access occurs, performs arbitration between the requests made by the PEs 111-114.

Figure 3:
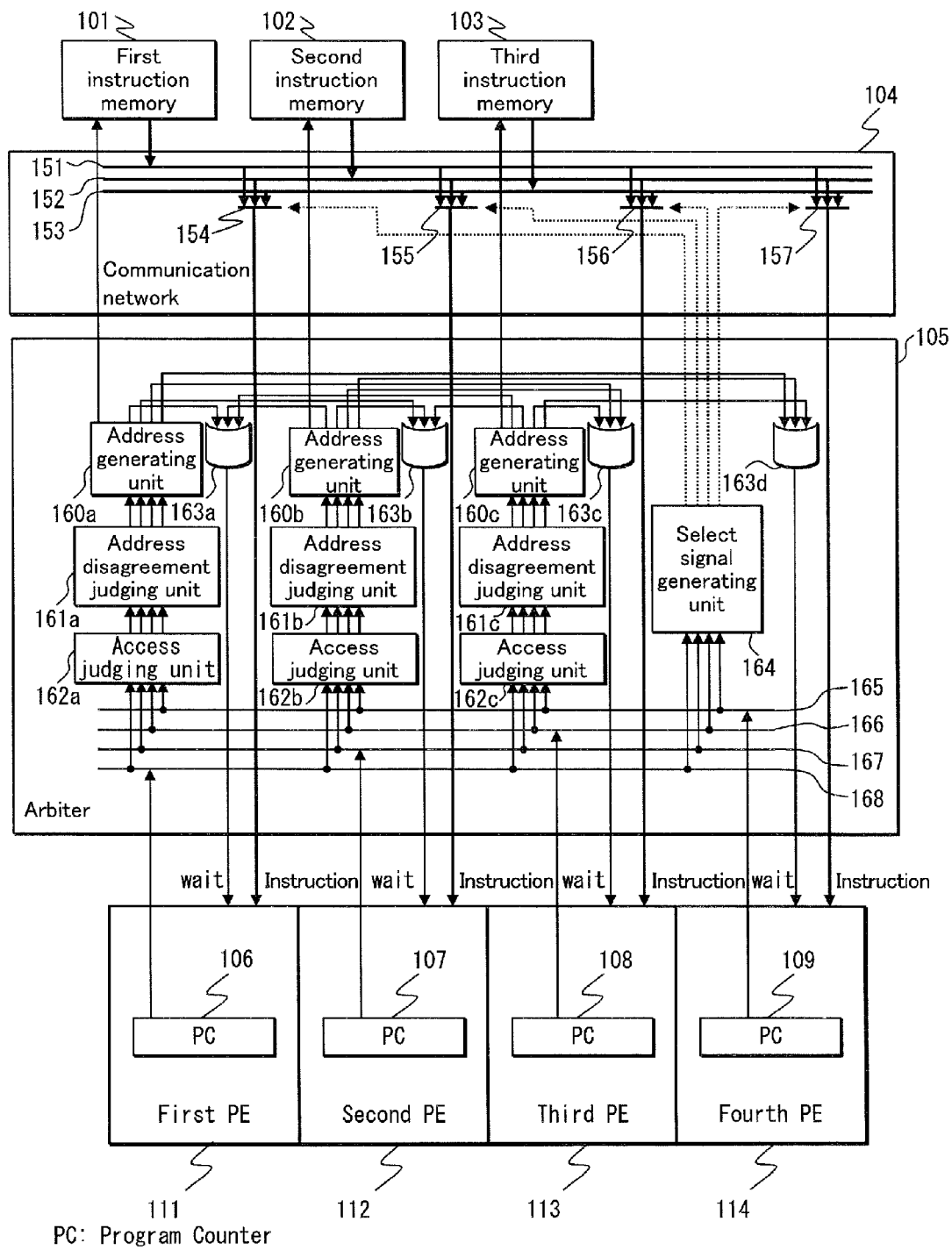
FIG. 3 is a diagram illustrating a structure of a communication network 104 and an arbiter 105.

More specifically, the arbiter 105 includes: an address generating unit 160a; an address generating unit 160b; an address generating unit 160c; an address disagreement judging units 161a; an address disagreement judgment unit 161b; an address disagreement judging unit 161c; an access judging unit 162a; an access judging unit 162b; an access judging unit 162c; a wait signal generating unit 163a; a wait signal generating unit 163b; a wait signal generating unit 163c; a select signal generating unit 164; a bus 165; a bus 166; a bus 167; and a bus 168 as illustrated in FIG. 3.

The access judging unit 162a judges which of the PEs is requesting access to the first instruction memory 101.

The address disagreement judging unit 161a judges, with respect to two or more PEs requesting access to the instruction memory 101, whether the addresses of the first instruction memory 101 which are requested by the two or more PEs are the same.

The address generating unit 160a is provided with the two functions of: (i) judging whether or not conflict is occurring for access to the first instruction memory 101; and (ii) generating an address for accessing the first instruction memory 101. In specific, when it is judged by the address disagreement judging unit 161a that, with respect to two or more of the PEs which are requesting access to the first instruction memory 101, the addresses requested thereby are different addresses of the first instruction memory 101, the address generating unit 160a generates an address, specifically by the conflict judgment function causing the address generating function to give priority to an address of the first instruction memory 101 indicated by the smallest address value among the addresses requested, and generating the address so prioritized. Here, the address generated by the address generating function of the address generating unit 160a is an address to be used in accessing the first instruction memory 101. In the generation of an address by the address generating unit 160a, when requests have been made by the PEs for access to different addresses of the first instruction memory 101, the address generating unit 160a generates the smallest address value by utilizing the conflict judgment function as described in the above. On the other hand, when requests have been made by different ones of the PEs with respect to the same address of the first instruction memory 101, an address value corresponding to the address is generated.

Additionally, the access judging unit 162b and the access judging unit 162c are respectively associated with the second instruction memory 102 and the third instruction memory 103, and the functions provided thereto are similar to those of the access judging unit 162a. Therefore, detailed description on the access judging unit 162b and the access judging unit 162c is omitted.

Similarly, the address disagreement unit 161b and address disagreement unit 161c are respectively associated with the second instruction memory 102 and the third instruction memory 103, and the functions provided thereto are similar to those of the address disagreement unit 161a. Therefore, detailed description on the address disagreement unit 161b and address disagreement unit 161c is omitted.

Further, the address generating unit 160b and address generating unit 160c are respectively associated with the second instruction memory 103 and the third instruction memory 103, and the functions provided thereto are similar to those of the address generating unit 160a. Therefore, detailed description on the address generating unit 160b and address generating unit 160c is omitted.

The wait signal generating unit 163a generates a wait signal and issues the wait signal with respect to the first PE 111. The generating and issuing of the wait signal is performed according to the results of the judgments made by the conflict judgment functions of the address generating units 160a-160c.

The wait signal generating unit 163b generates a wait signal and issues the wait signal with respect to the second PE 112. The generating and issuing of the wait signal is performed according to the results of the judgments made by the conflict judgment functions of the address generating units 160a-160c.

The wait signal generating unit 163b generates a wait signal and issues the wait signal with respect to the third PE 113. The generating and issuing of the wait signal is performed according to the results of the judgments made by the conflict judgment functions of the address generating units 160a-160c.

The wait signal generating unit 163d generates a wait signal and issues the wait signal with respect to the fourth PE 114. The generating and issuing of the wait signal is performed according to the results of the judgments made by the conflict judgment functions of the address generating units 160a-160c.

The select signal generating unit 164 generates a signal indicating the instruction memories to which the PEs 111-114 are making requests for instruction.

The bus 168 receives a value of the PC 106 of the first PE 111, and the bus 167 receives a value of the PC 107 of the second PE 112. Similarly, the bus 166 receives a value of the PC 108 of the third PE 113, and the bus 165 receives a value of the PC 109 of the fourth PE 114. Each of the buses 165-168 outputs a value to each of the access judging units 162a-162c.

(5) The Communication Network 104

As illustrated in FIG. 3, the communication network 104 includes: a bus 151; a bus 152; a bus 153; an output unit 154; an output unit 155; an output unit 156; and an output unit 157.

The bus 151 receives an instruction corresponding to the address generated by the address generating unit 160a from the first instruction memory 101.

The bus 152 receives an instruction corresponding to the address generated by the address generating unit 160b from the second instruction memory 102.

The bus 153 receives an instruction corresponding to the address generated by the address generating unit 160c from the third instruction memory 103.

The output units 154-157 are respectively allocated to the first PE 111-the fourth PE 114. Each of the output units 154-157 outputs an instruction obtained from one of the first instruction memory 101-the third instruction memory 103 to the corresponding one of the PEs. The outputting of the instructions to the PEs is performed in accordance with the signal generated by the signal generating unit 164. To provide a specific example, the output unit 154 receives, via the bus 151, an instruction from one of the instruction memories to which a request for instruction was made by the first PE 111, and outputs the instruction received to the first PE 111. The PE to which the instruction is output is determined according to the signal generated by the select signal generating unit 164.

1.2 Operations

In the following, description is provided on operations of the information processing apparatus 100, with reference to the accompanying drawings.

(1) Processing where all PEs Perform a Common Operation

Figure 4:
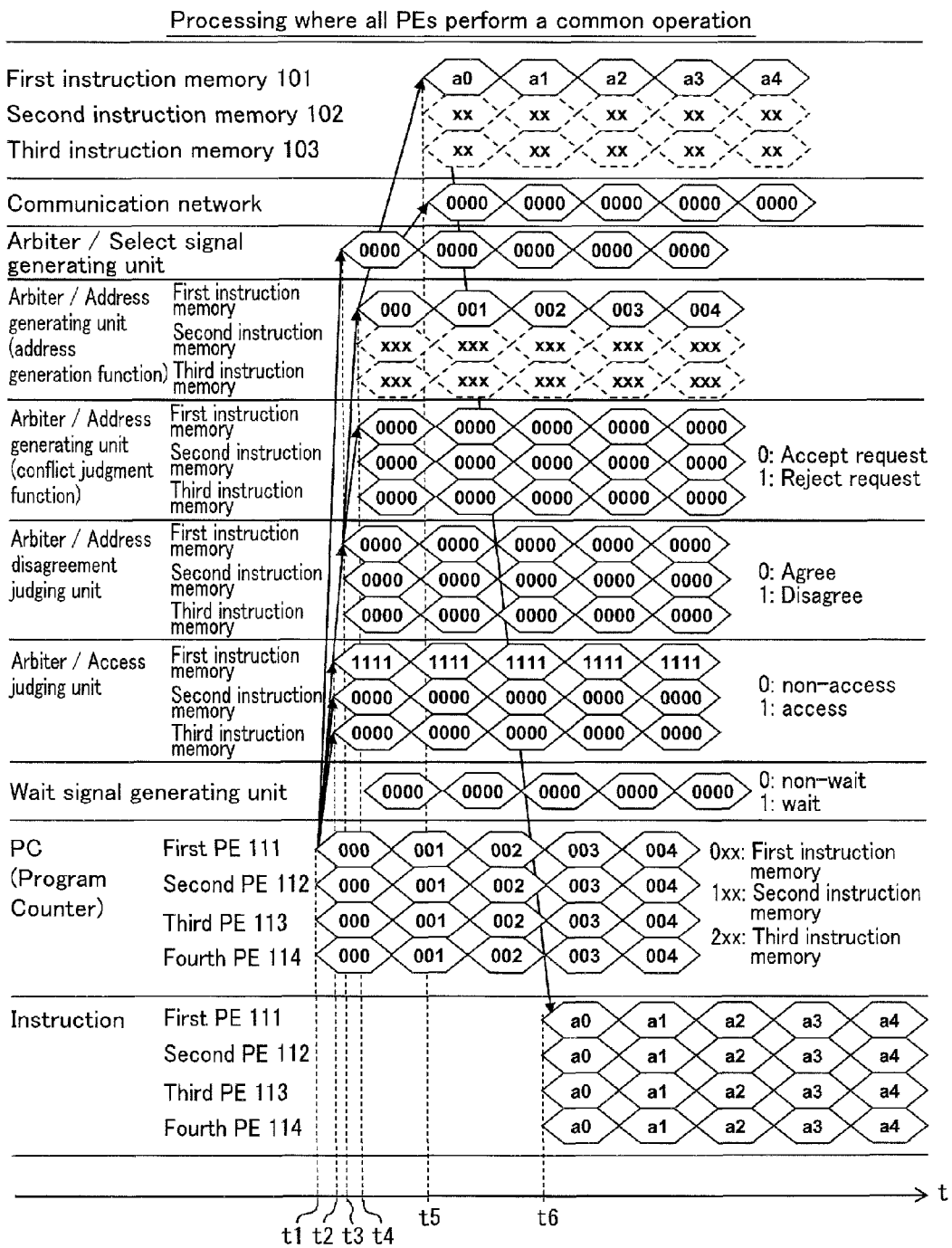
FIG. 4 is a timing chart illustrating processing where all PEs perform a common operation in parallel.

Firstly, description is provided on a case where all of the PEs perform a common operation, referring to the timing chart provided in FIG. 4.

The first PE 111-the fourth PE 114 commonly make a request for a same instruction of the SIMD program 200 of the first instruction memory 101 according to a value indicated by the program counters thereof (t1). The values that the program counters indicate are consisted of three digits, and the highest digit indicates either "0", "1", or "2". Here, the "0" in the highest digit indicates the first instruction memory 101, the "1" in the highest digit indicates the second instruction memory 102, and the "2" in the highest digit indicates the third instruction memory 103. The remaining two digits of the program counter values identify an instruction stored in the instruction memory indicated by the highest digit, and compose, for example, an address corresponding to an instruction. For instance, when the value of a program counter indicates "000", the PE provided with the program counter makes a request, to the first instruction memory 101, for an instruction which is indicated by the number "00". Thus, at time t1 in FIG. 4, it could be seen that all of the PEs are commonly requesting the same instruction "00" of the first instruction memory 101.

The access judging units 162a-162c and the select signal generating unit 164 each receive a program counter value from each of the PEs (t2). Each of the access judging units 162a-162c judges which PE is requesting access to the instruction memory allocated thereto, according to the program counter value received. Accordingly, each of the access judging units 162a-162c outputs the result of the judgment (referred to hereinafter as an "access judgment result") to the corresponding one of the address disagreement judging units 161a-161c. Each of the access judgment results output by the access judging units 162a-162c is a four-digit number. In each of the access judgment results, the first digit, the second digit, the third digit, and the fourth digit respectively correspond to the first PE 111, the second PE 112, the third PE 113, and the fourth PE 114. In addition, each digit is provided with a value "0" or a value "1". The value "0" provided to a certain digit indicates that the corresponding one of the PEs has not made a request for access to the instruction memory allocated to the access judging unit (non-access), and the value "1" provided to a certain digit indicates that the corresponding PE has made a request for access to the instruction memory allocated to the access judging unit. For instance, when all of the program counter values received by the access judging unit 162a at time t2 indicates "000", the access judging unit 162a generates a four-digit value "1111", which indicates that all of the PEs are commonly requesting access to the first instruction memory 101. Additionally, each of the access judging units 162b and 162c, at time t2, generates a four-digit value "0000" indicating that none of the PEs are requesting access to the corresponding one of the second instruction memory 102 and the third instruction memory 103.

Each of the address disagreement judging units 161a-161c receives the access judgment result from the corresponding one of the access judging units 162a-162c (t3). Then, according to the access judgment result so received, each of the address disagreement judging units 161a-161c judges whether the PEs which are requesting access to the instruction memory allocated thereto are requesting access to different addresses of the instruction memory. Accordingly, each of the access disagreement judging units 161a-161c outputs the result of the judgment (referred to hereinafter as an "address judgment result") to the corresponding one of the address generating units 160a-160c. Each of the address judgment results output by the address disagreement judging units 161a-161c is a four-digit number. In each of the address judgment results, the first digit, the second digit, the third digit, and the fourth digit respectively correspond to the first PE 111, the second PE 112, the third PE 113, and the fourth PE 114. In addition, each digit is provided with a value "0" or a value "1". The value "0" provided to a certain digit of the address judgment result indicates that conflict is not taking place between the corresponding PE and other PEs for access to the instruction memory allocated to the address disagreement judging unit, and the value "1" provided to a certain digit indicates that conflict is taking place between the corresponding PE and other PEs. For instance, when receiving the access judgment result from the access judging unit 162a at time t3, the address disagreement judging unit 161a outputs a four-digit value "0000". The value "0000" output by the address disagreement judging unit in this case indicates that each of the PEs indicated by first to fourth digit is not in conflict with other PEs for access to the first instruction memory 101. Here, the judgment is made that conflict is not taking place between PEs for access to the first instruction memory 101 allocated to the address disagreement judging unit 161a, since the first PE 111-the fourth PE 114 are commonly requesting the same instruction of the first instruction memory 101, and thus, access is being made to the same address among the multiple addresses of the first instruction memory 101. Further, with respect to the address disagreement judging units 161b and 161c, no request is being made by the PEs for access to the corresponding instruction memories 102 and 103. Thus, each of the address disagreement judging units 161b and 161c judges that no conflict is taking place between PEs, and thus generates a value "0000" as the address judgment result.

Each of the address generating units 160a-160c receives the address judgment result from the corresponding one of the address disagreement judging units 161a-161c (t4). Then, according to the address judgment result received from the corresponding one of the address disagreement judging units 161a-161c, each of the address generating units 160a-160c generates an address of the instruction of the corresponding instruction memory for which request is being made. More specifically, each of the address generating units 160a-160c, by using the conflict judgment function provided thereto, makes a judgment of whether or not to accept the request for access being made to the corresponding instruction memory. The judgment is made according to the address judgment result provided from the corresponding one of the address disagreement judging units 161a-161c. As already mentioned in the above, the address judgment result indicates whether or not conflict is taking place between different PEs. Each of the results of the judgments performed by the address generating units 160a-160c (hereinafter, to be referred to as a "request acceptance result") is a four-digit number. In each of the request acceptance results, the first digit, the second digit, the third digit, and the fourth digit respectively correspond to the first PE 111, the second PE 112, the third PE 113, and the fourth PE 114. In addition, each digit is provided with a value "0" or a value "1". The value "0" provided to a certain digit indicates that the request being made by the corresponding PE is to be accepted, and the value "1" provided to a certain digit indicates that the request being made by the corresponding PE is not to be accepted. When it is judged that conflict is taking place between different PEs for access to different instructions or addresses of the same instruction memory, each of the address generating units 160a-160c outputs the four-digit request acceptance result to each of the wait signal generating units 163a-163d. Since no conflict is taking place in the example illustrated in FIG. 4, the request acceptance results are not output to the wait signal generating units 163a-163d. Accordingly, each of the address generating units 160a-160c, by using the address generation function provided thereto, generates an address indicating an instruction of the corresponding instruction memory. Further, the address so generated is transmitted to the corresponding one of the instruction memories 101-103. Here, the instruction with respect to which the generation of the address is performed is limited to an instruction access to which by one of the PEs has been accepted. In the example illustrated in FIG. 4, only the address generating unit 160a, among the address generating units 160a-160c, generates an address (000) of the instruction commonly requested by all of the first PE 111-the fourth PE 114, and transmits the address to the first instruction memory 101.

In the meantime, the select signal generating unit 164, when receiving program counter values from the program counters 106-109 of the respective PEs at time t2, determines the instruction memories to which the first PE 111-the fourth PE 114 are requesting access to. Accordingly, the select signal generating unit 164 outputs the result of the determination to the communication network 104. The determination result output by the select signal generating unit 164 is a four-digit number. The first digit, the second digit, the third digit, and the fourth digit of the determination result respectively correspond to the first PE 111, the second PE 112, the third PE 113, and the fourth PE 114. In addition, each digit is provided with a value "0", a value "1", or a value "2". A "0" provided to a certain digit indicates that the corresponding PE is requesting an instruction of the first instruction memory 101, a "1" provided to a certain digit indicates that the corresponding PE is requesting an instruction of the second instruction memory 102, and a "2" provided to a certain digit indicates that the corresponding PE is requesting an instruction of the third instruction memory 103.

Subsequently, the first instruction memory 101 receives the address generated by the address generating unit 160*a*, and the communication network 104 receives the determination result generated by the select signal generating unit 164 (t5). Then, the first instruction memory 101 outputs an instruction "a0" indicated by the address received from the address generating unit 160*a* to the communication network 104. Upon receiving the instruction "a0" from the first instruction memory 101, the communication network 104 outputs the instruction "a0" to appropriate ones of the first PE 111-the fourth PE 114 according to the determination result received from the select signal generating unit 164. That is, the communication network 104 outputs the instruction "a0" to the PE having made the request for the instruction. In the example illustrated in FIG. 4, the instruction "a0" is output to all of the first PE 111-the fourth PE 114.

When receiving the instruction "a0" from the communication network 104 (t6), each of the first PE 111-the fourth PE 114 executes the instruction "a0" so received.

(2) Processing where Some of the PEs Perform a Common Operation

In the following, description is provided on a transition from processing where all PEs perform a common operation in parallel to processing where some of the PEs perform a common operation in parallel, with reference to the accompanying timing chart illustrated in FIG. 5.

Firstly, the first PE 111-the fourth PE 114 commonly make requests for a same instruction of the SIMD program 200 of the first instruction memory 101 according to the program counter value "000" of the respective program counters. It should be noted that operations following this point and up to the point where the first PE 111-the fourth PE 114 execute the same instruction output from the first instruction memory 101 have already been described in the above with reference to FIG. 4, and therefore explanation thereof is omitted.

Following this, requests are made for different instructions of the instruction memory 101 by the first PE 111-the fourth PE 114 according to the respective program counter values (t10). In the example illustrated in FIG. 5, the first PE 111 is requesting an instruction "a5" of the first instruction memory 101 that is indicated by a value "05". Similarly, the second PE 112 and the third PE 113 are commonly requesting an instruction "a3" of the first instruction memory 101 that is indicated by a value "03", and the fourth PE 114 is requesting an instruction "a1" of the first instruction memory 101 that is indicated by a value "01".

The access judging units 162*a*-162*c* and the select signal generating unit 164 each receive a program counter value from each of the PEs (t11). Each of the access judging units 162*a*-162*c* determines which PE is requesting access to the instruction memory allocated thereto, according to the program counter value so received. Accordingly, each of the access judging units 162*a*-162*c* outputs an access judgment result to the corresponding one of the address disagreement judging units 161*a*-161*c*. In the example illustrated in FIG. 5, the first PE 111-the fourth PE 114 are commonly requesting access to the first instruction memory 101, and thus, the access judging unit 162 outputs a value "1111" as the access judgment result. On the other hand, the access judging unit 162*b* and the access judging unit 162*c* each generate a value "0000" as the access judgment result.

Each of the address disagreement judging units 161*a*-161*c* receives the access judgment result from the corresponding one of the access judging units 162*a*-162*c* (t12). Then, according to the access judgment result so received, each of the address disagreement judging units 161*a*-161*c* judges whether the PEs which are requesting access to the instruction memory allocated thereto are requesting access to different addresses of the instruction memory. Accordingly, each of the address disagreement judging units 161*a*-161*c* outputs an address judgment result to the corresponding one of the address generating units 160*a*-160*c*.

Figure 5:
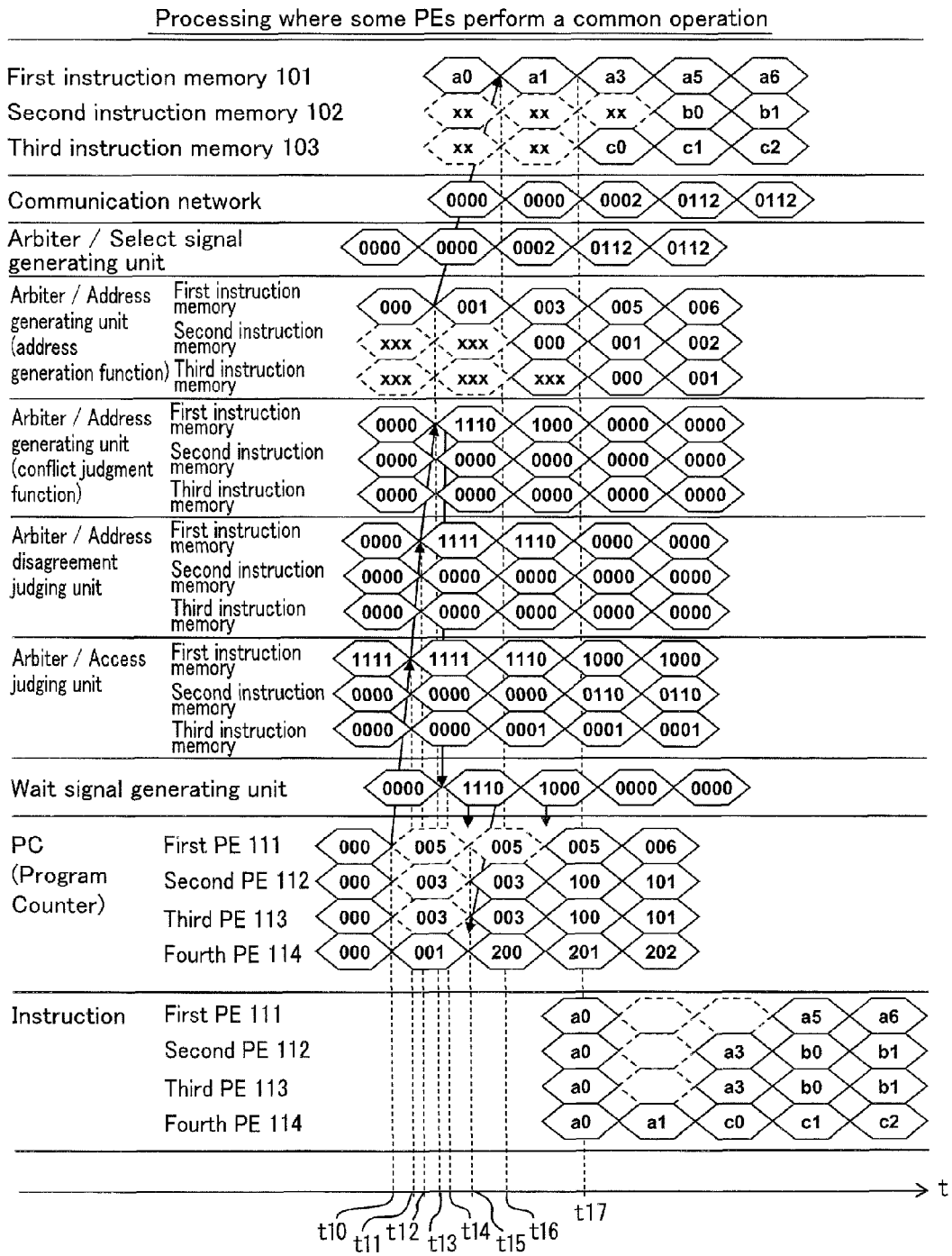
FIG. 5 is a timing chart illustrating a transition from processing where all PEs perform a common operation in parallel to processing where some of the PEs perform a common operation in parallel.

In the example illustrated in FIG. 5, the address disagreement judging unit 161*a* allocated to the first instruction memory 101 judges that conflict is taking place between each of the first PE 111-the fourth PE 114 and other ones of the first PE 111-the fourth PE 114 for different instructions or addresses of the instruction memory 101, and thereby outputs a value "1111" as the address judgment result. Further, with respect to the address disagreement judging units 161*b* and 161*c*, no request for access is being made by the PEs to the corresponding instruction memories 102 and 103. Thus, each of the address disagreement judging units 161*b* and 161*c* generates a value "0000" as the address judgment result.

Each of the address generating units 160*a*-160*c* receives the address judgment result from the corresponding one of the address disagreement judging units 161*a*-161*c* (t13). Then, according to the address judgment result received from the corresponding one of the address disagreement judging units 161*a*-161*c*, each of the address generating units 160*a*-160*c* generates an address indicating an instruction of the corresponding one of the instruction memories for which request is being made. More specifically, first of all, each of the address generating units 160*a*-160*c*, by utilizing the conflict judgment function, makes a judgment of whether or not to accept the request for access being made with respect to the corresponding instruction memory by the PEs according to the address judgment result provided from the corresponding one of the address disagreement judging units 161*a*-161*c*. As already mentioned in the above, the address judgment result indicates whether or not conflict is taking place between different PEs. Here, since it is judged that conflict is taking place, the address generating unit 160*a* outputs a request acceptance result to each of the wait signal generating units 163*a*-163*d*.

In the example illustrated in FIG. 5, conflict is taking place between PEs for access to different instructions of the first instruction memory 101. Thus, the address generating unit 160*a* accepts one of the requests being made to instructions of the first instruction memory 101, for instance the request for the instruction of the first instruction memory 101 which is indicated by the smallest address value (in the example, value "01"), and rejects the requests being made with respect to other instructions of the first instruction memory 101. Accordingly, the address generating unit 160*a* generates a request acceptance result of "1110". Accordingly, the request acceptance result so generated is output to each of the wait signal generating units 163*a*-163*d*. It should be noted that, in this case, the address generating unit 160*b* and the address generating unit 160*c* judge that no conflict is taking place for instructions of the instruction memories corresponding thereto. Thus, the address generating unit 160*b* and the access generating unit 160*c* do not output request acceptance results to the wait signal generating units 163*a*-163*d*. Additionally, each of the address generating units 160*a*-160*c*, by utilizing the address generation function, generates an address indicating an instruction of the corresponding instruction memory and transmits the address so generated to the corresponding instruction memory. Here, the instruction with respect to which the generation of the address is performed is limited to an instruction access to which by one of the PEs has been accepted. In the example illustrated in FIG. 5, the address generating unit 160a generates an address (001) of the instruction of the first instruction memory 101 requested by the fourth PE 114, and outputs the address (001) to the first instruction memory 101.

In the mean time, the select signal generating unit 164, when receiving program counter values from the program counters 106-109 of the respective PEs at time dl, determines the instruction memories to which the first PE 111-the fourth PE 114 are making requests for instructions. Accordingly, the select signal generating unit 164 outputs the determination result to the communication network 104. In the example illustrated in FIG. 5, the determination result generated by the select signal generating unit 164 is a value "0000".

In addition, each of the wait signal generating units 163a-163d receives a request acceptance result from the address generating units 160a-160c (t14). Here, it should be noted that the wait signal generating units 163a-163d receive request acceptance results only from certain ones of the address generating units having generated request acceptance results of values other than "0000". Following this, the wait signal generating units 163a-163d issue wait signals to the corresponding PEs according to the request acceptance results so received (t15). In the example illustrated in FIG. 5, the wait signal generating units 163a-163d receive a value "1110" as the request acceptance result from the address generating unit 160a. Accordingly, the wait signal generating units 163a-163c issue wait signals to the PEs (in this case, the first PE 111-the third PE 113), which correspond to digits of the request acceptance result provided with the value "1".

Subsequently, the first instruction memory 101 receives the address generated by the address generating unit 160a. Also, the communication network 104 receives the determination result generated by the select signal generating unit 164 (t16). Then, the first instruction memory 101 outputs an instruction "a1" indicated by the address received from the address generating unit 160a to the communication network 104. Upon receiving the instruction "a1" from the first instruction memory 101, the communication network 104 outputs the instruction "a1" to appropriate ones of the PEs 111-114 according to the determination result received from the select signal generating unit 164. That is, the communication network 104 outputs the instruction "a1" to the PE having made the request for the instruction. In this case, the instruction "a1" is output to the fourth PE 114.

When receiving the instruction "a1" from the communication network 104 (t17), the fourth PE 114 executes the instruction "a1" so received.

Since the program counter 109 of the fourth PE 114 is subsequently requesting an instruction of one of the instruction memories besides the first instruction memory 101 (in this example, the instruction memory 103), the instruction "a3", whose address is indicated by the smallest value among the instructions requested by the first PE 111-the third PE 113, which have received wait signals, is executed by the second PE 112 and the third PE 113. In the meantime, a wait signal is issued once more with respect to the first PE 111.

The description having been provided up to this point provides information concerning processing where some of the PEs perform a common operation in parallel and the timing at which wait signals are issued during such processing.

Furthermore, in the example illustrated in FIG. 5, all of the PEs first execute the instruction "a0", and then certain ones of the PEs perform a common operation. Thus, the description having been provided in this section provides information concerning the way in which transition occurs from processing where all PEs perform a common operation in parallel to processing where certain ones of the PEs perform a common operation in parallel.

Figure 6:
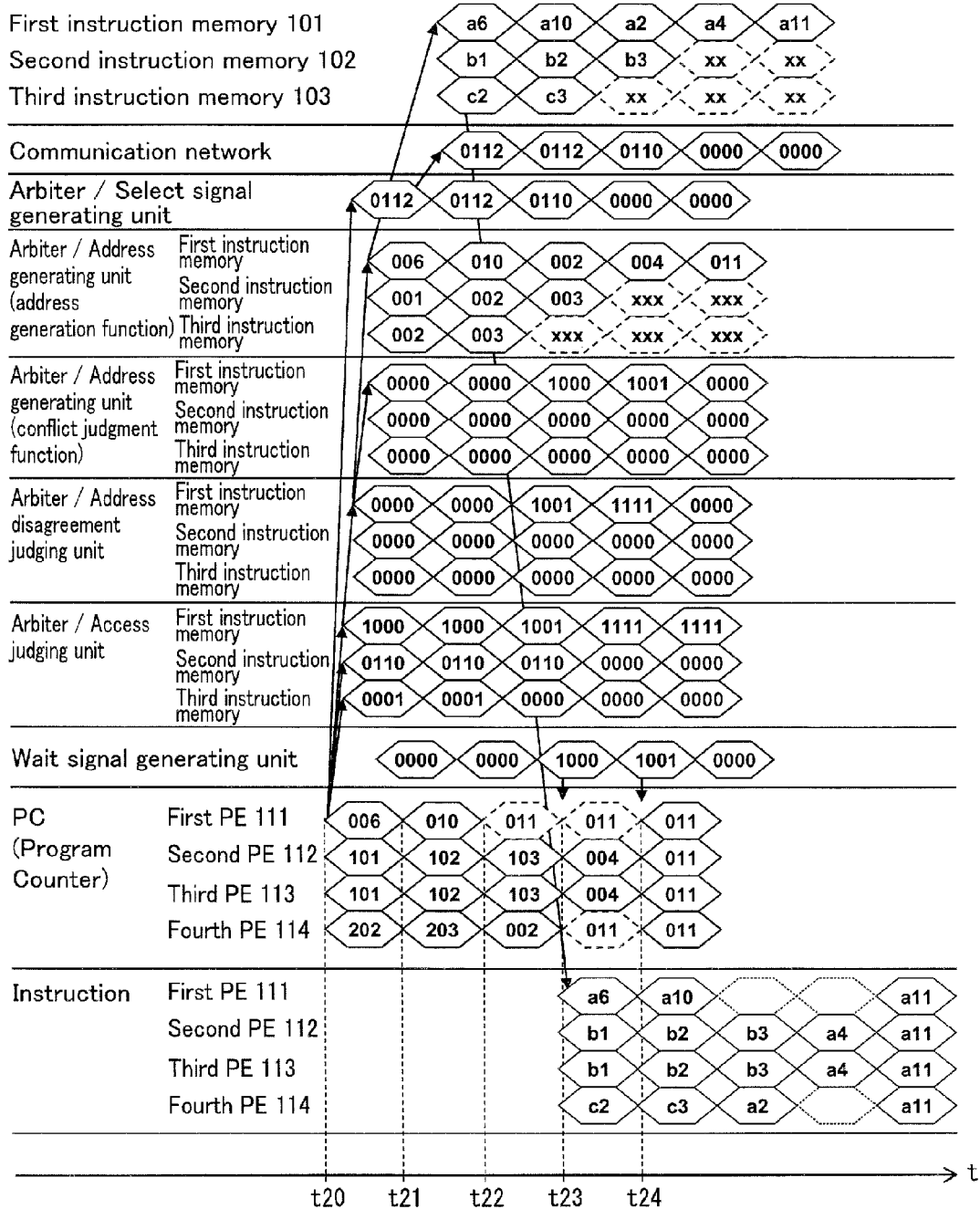
FIG. 6 is a timing chart illustrating a transition from processing where some of the PEs perform a common operation in parallel to processing where all of the PEs perform a common operation in parallel.

(3) Transition from Processing where Some of the PEs Perform a Common Operation to Processing where all of the PEs Perform a Common Operation In the following, description is provided on the transition between different types of processing, where first, only a specific number of the PEs perform a common operation, and then, all of the PEs perform a common operation, with reference to the accompanying timing chart illustrated in FIG. 6.

Description has been already provided in the above with reference to accompanying FIGS. 4 and 5 concerning the transferring of data between each of the components of the information processing apparatus 100 during processing where certain ones of the PEs perform a common operation in parallel and during processing where all of the PEs perform a common operation in parallel. Thus, description thereof is omitted in the following, and brief explanation is made focusing on the transition between the two different types of processing as described in the above.

First of all, requests are made by the first PE 111-the fourth PE 114 for instructions of the instruction memories 101-103 according to the respective program counter values at time t20. For instance, since the program counter 106 of the first PE 111 indicates a value "006", the first PE 111 makes a request for an instruction "a6" of the first instruction memory 101. The second PE 112 and the third PE 113 commonly make a request for an instruction "b1" of the second instruction memory 102. Finally, the fourth PE 114 makes a request for an instruction "c2" of the third instruction memory 103. In this case, no conflict takes place between PEs. Thus, the first PE 111-the fourth PE 114 execute the respective instructions that they have requested.

At t21, the first PE 111 makes a request for an instruction "a10" of the first instruction memory 101. The second PE 112 and the third PE 113 commonly make a request for an instruction "b2" of the second instruction memory 102. The fourth PE 114 makes a request for an instruction "c3" of the third instruction memory 103. In this case, the first PE 111-the fourth PE 114 execute the respective instructions that they have requested, similar as in the processing taking place at t20.

At t22, the first PE 111 makes a request for an instruction "a11" of the first instruction memory 101. The second PE 112 and the third PE 113 commonly make a request for an instruction "b3" of the second instruction memory 102. The fourth PE 114 makes a request for an instruction "a2" of the first instruction memory 101. In this case, conflict between PEs is taking place. More specifically, the first PE 111 and the fourth PE 114 are making requests for a different instruction (address) of the same instruction memory (in this example, the first instruction memory 101). Hence, the arbiter 105 performs arbitration between the first PE 111 and the fourth PE 114, and as a result, the request for the instruction "a2" having the smallest address value is accepted. Accordingly, a wait signal is issued to the first PE 111 having requested the instruction "a11". As such, among the instructions having been requested at time t22, the instruction "b3" having been requested by the second PE 112 and the third PE 113, and the instruction "a2" having been requested by the fourth PE 114 are executed.

At t23, the first PE 111 and the fourth PE 114 commonly make a request for an instruction "a11" of the first instruction memory 101. Additionally, the second PE 112 and the third PE 113 commonly make a request for an instruction "a4" of the first instruction memory 101. In this case, conflict is taking place similar as in the case at time t22. Hence, the arbiter 105 performs arbitration, and as a result, the instruction "a4" indicated by the smallest address value is accepted. Accordingly, wait signals are issued to the first PE 111 and the fourth PE 114. As such, among the instructions having been requested at time t23, the instruction "a4" having been requested by the second PE 112 and the third PE 113 is executed.

At t24, all of the PEs, namely the first PE 111-the fourth PE 114, are commonly making a request for the instruction "a11" of the first instruction memory 101. Thus, the arbiter 105 does not perform arbitration, and the requests having been made by all of the PEs are accepted. As a result, each of the first PE 111-the fourth PE 114 executes the same instruction "a11".

From the description provided in the above, it could be seen that the transition from processing where some of the PEs perform a common operation in parallel to processing where all of the PEs perform a common operation in parallel has been successfully completed.

1.3 Supplementary Explanation of Operations

In the following, supplementary explanation is provided concerning the operations of the information processing apparatus 100.

Note that the following description is provided under the presumption that the information processing apparatus 100 performs video decoding of, for instance, MPEG-encoded video.

Each of the first PE 111-the fourth PE 114 issues a request for an instruction, along with an address of the memory which is to be accessed, to the arbiter 105 in order as to access one of the first instruction memory 101-the third instruction memory 103. The issuing of the request is performed according to the program counter value of the corresponding one of the program counters 106-109. The arbiter 105 interprets the requests received from the plurality of processor elements and specifies the addresses of the first instruction memory 101-the third instruction memory 103 to which requests for access have been made. When access is requested by the processor elements to different instruction memories or to a same address of the same instruction memory, conflict does not take place between the processor elements. As such, the arbiter 105 requests the communication network 104 to establish appropriate connections between the first instruction memory 101-the third instruction memory 103 and the first PE 111-the fourth PE 114. By such connections being established, the instructions from the first instruction memory 101-the third instruction memory 103 are supplied to the first PE 111-the fourth PE 114, and the PEs commence processing according to the instructions having been supplied.

When the program counter values of the program counters 106-109 corresponding to the first PE 111-the fourth PE 114 indicate a same value, request is being made for an instruction of the same instruction memory indicated by a same memory address. In such a case, a same instruction is provided to the first PE 111-the fourth PE 114 and the PEs perform an SIMD operation. For instance, the information processing apparatus 100 executes the SIMD program 200 as illustrated in FIG. 2 in such a case.

Additionally, when the information processing apparatus 100 is to perform decoding of, for instance, four macroblocks, and when two of the four macroblocks are of the same type, the information processing apparatus 100 operates as described in the following. The program counter values of two of the PEs (in this example, the second PE 112 and the third PE 113) indicate a same value, and indicate a same memory address of the same instruction memory. Further, the remaining PEs (in this example, the first PE 111 and the fourth PE 114) request access to different instruction memories. Thus, conflict between PEs caused by access being requested to different addresses of the same memory does not take place. As such, a same instruction is supplied to the second PE 112 and the third PE 113 from the second instruction memory 102, and the first PE 111 and the fourth PE 114 are respectively provided with instructions from the first instruction memory 101 and the third instruction memory 103, for example, in such a case. This realizes the execution of an MIMD operation (partially an SIMD operation) by the information processing apparatus 100. Further, the first PE 111-the fourth PE 114 perform processing according to the instructions supplied thereto. For instance, if the instructions are memory access instructions, the first PE 111-the fourth PE 114 access the corresponding data memories 115-118, fetch data from the corresponding data memories 115-118, and perform arithmetic processing according to arithmetic processing instructions to be later supplied. As such, simultaneous processing of different types of macroblocks can be performed by applying different programs for each of different macroblock types.

On the other hand, when the arbiter 105 interprets the requests received from the first PE 111-the fourth PE 114, specifies the addresses to which requests for access are being made, and finds that conflict is taking place, where access is being requested to different addresses of the same memory, only the instruction indicated by the smallest address value among the instructions requested is accepted. The remaining requests, in this case, are rejected. That is, a request from only one PE is accepted, and the other PEs are caused to wait. Hence, it is possible to provide the SIMD program 200 and the MIMD program 201 together on a same instruction memory, which is the first instruction memory 101 in this case.

In the example illustrated in FIG. 2, firstly, all of the PEs execute a SIMD program. Subsequently, branching of processing is caused by the switch command illustrated in the drawing, and therefore, each of the PEs execute a corresponding one of the MIMD programs 201-203. When the execution of the MIMD programs 201-203 have been completed, the PEs return to the SIMD program 200, wait for synchronization to occur, and execute the SIMD program 200 once more. Additionally, as could be seen in the example illustrated in FIG. 2, the MIMD program 201, which is the shortest program among the MIMD programs 201-203, is provided to the first instruction memory 101. Hence, the frequency at which conflict takes place when the PEs return to the SIMD program 200 once more, after having completed the execution of the MIMD programs 201-203, is suppressed. This is since the execution of the MIMD program 201 is completed earlier compared to the other MIMD programs. Thus, when the execution of other MIMD programs is completed, there is a high possibility that the first instruction memory 101 is not currently in use.

As description has been provided in the above, the information processing apparatus 100 is able to perform processing where, for instance, a common operation, which is performed irrespective of the types of macroblocks to be processed, is performed by using the SIMD program 200 while operations, which vary according to the type of macroblock to be processed, are performed by using the MIMD programs 201-203. Hence, the information processing apparatus 100 is able to perform processing with an enhanced level of concurrency and efficiency.

In addition, as could be seen from the description provided in the above, one or more PEs among the plurality of PEs are able to execute the same MIMD program under control of the arbiter 105. That is, the MIMD programs can be executed by one or more PEs to execute common processing, which is similar to the execution of the SIMD program for conducting common processing.

Further in addition, one or more PEs among the plurality of the PEs are able to execute the SIMD program under control by the arbiter 105, similarly as in the execution of the MIMD program. That is, in contrast to conventional processing using the SIMD program where all PEs are forced to perform common processing, the SIMD program of the information processing apparatus 100 can be used to cause only some of the PEs to perform common processing, while also being capable of causing all of the PEs to perform common processing.

2. Examples of Application

In the following, description is provided on examples of application of the information processing apparatus 100.

2.1 System LSI 500

Figure 7:
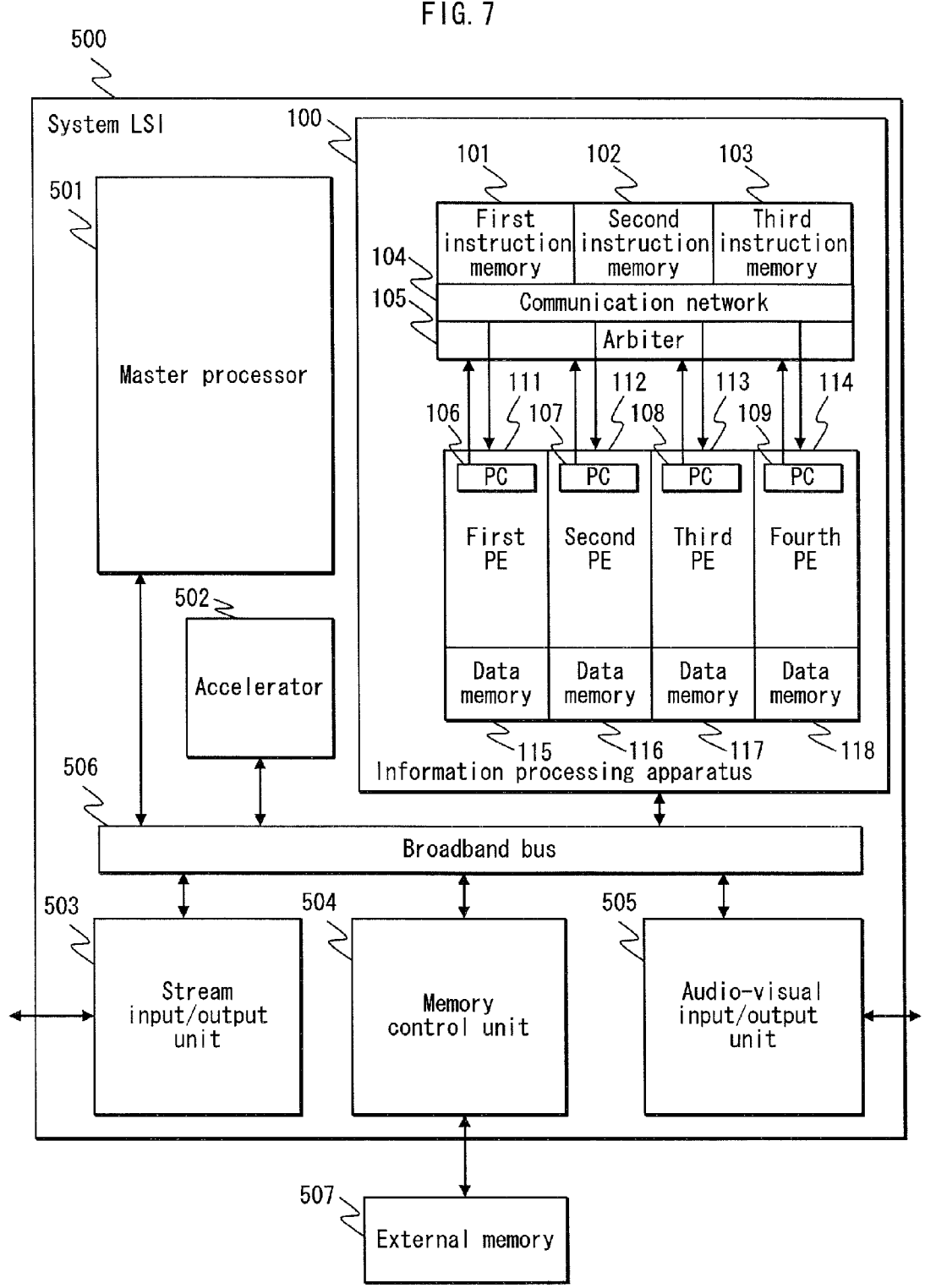
FIG. 7 is a block diagram illustrating a structure of a system LSI 500 incorporating the information processing apparatus 100.

FIG. 7 illustrates a system LSI 500 incorporating the information processing apparatus 100.

The system LSI 500 is provided with the functions of: (i) receiving streams such as broadcast waves, (ii) generating images from the streams so received, and (iii) outputting the generated images. The system LSI 500 includes: the information processing apparatus 100; a master processor 501; an accelerator 502; a stream input/output unit 503; a memory control unit 504; an audio-visual input/output unit 505; and a broadband bus 506.

The information processing apparatus 100 decodes encoded images included in the streams received. Here, decoding is performed of encoded image data in units of macroblocks, and such that (i) the SIMD program 200 is executed for macroblocks of the same type, and (ii) the MIMD programs 201-203 are executed for processing differing according to macroblock types.

Although the rest of the components included in the system LSI 500 are similar to those of a conventional system LSI, a brief explanation thereof is provided in the following.

The stream input/output unit 503 receives streams, and outputs the received streams to an external memory 507 via the broadband bus 506 and the memory control unit 504. The external memory 507 is an external device connected to the system LSI 500.

The audio-visual input/output unit 505 obtains decoded images stored in the external memory 507 via the broadband bus 506 and the memory control unit 504, and outputs the decoded images obtained to outside the system LSI 500.

The memory control unit 504 performs writing of data to the external memory 507 and reading of data from the external memory 507. In specific, the memory control unit 504 writes data (encoded image data) of the stream received by the stream input/output unit 503 to the external memory 507. The memory control unit 504 reads out macroblocks composing the image data to be decoded from the external memory 507, and outputs the data to the information processing apparatus 100 via the broadband bus 506. In addition, when receiving macroblocks decoded by the information processing apparatus 100 from the information processing apparatus 100 via the broadband bus 506, the memory control unit 504 writes the decoded macroblocks to the external memory 507. Further, the memory control unit 504 reads out decoded images from the external memory 507 and outputs the decoded images so obtained to the audio-visual input/output unit 505.

The master processor 501 controls the overall operation of the system LSI 500. In specific, the master processor 501 controls the operations of the stream input/output unit 503, the memory control unit 504, and the audio-visual input/output unit 505.

The accelerator 502 is provided to the system LSI 500 for enhancing the processing ability thereof, particularly in terms of image processing, and reduces the processing load imposed upon the master processor 501 in the execution of image processing.

The broadband bus 506 performs input/output of data between various components of the system LSI 500.

As such, by applying the information processing apparatus 100 to the system LSI 500 which performs image processing, the system LSI 500 is able to perform common processing which is performed irrespective of macroblock types by executing the SIMD program 200, and processing which differs according to macroblock types by executing the MIMD programs 201-203. Hence, the system LSI 500 is able to perform processing with an enhanced level of concurrency and efficiency.

2.2 Television 600

Figure 8:
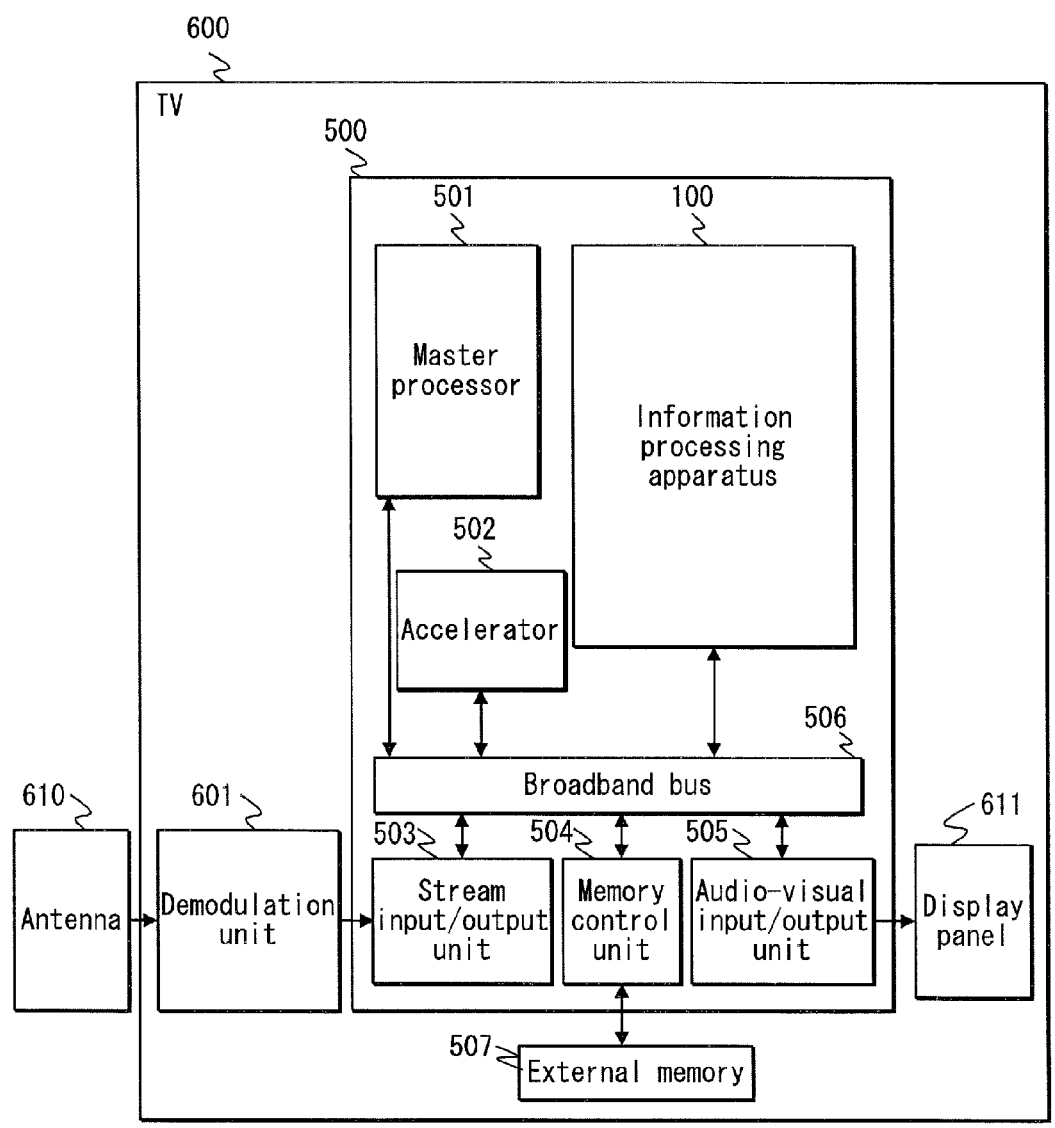
FIG. 8 is a block diagram illustrating a structure of a television 600 incorporating the information processing apparatus 100.

FIG. 8 illustrates a structure of a television 600 incorporating the above-described system LSI 500.

The television 600 includes: the system LSI 500; the external memory 507; a demodulation unit 601; and a display panel 611.

Since explanation concerning the system LSI 500 has already been provided in the above, description thereof is omitted in the following.

The external memory 507 has areas for storing encoded image data and decoded image data, as already mentioned in the above.

The demodulation unit 601 receives digital broadcast waves (streams) via an external antenna 610, and demodulates the stream signals so received. In addition, the demodulation unit 601 outputs the demodulated stream signals to the stream input/output unit 503 of the system LSI 500.

The display panel 611 displays images received from the audio-visual input/output unit 505 of the system LSI 500.

As such, by applying the above-mentioned system LSI 500 to the television 600, image processing is performed with an enhanced level of concurrency and efficiency.

2.3 Recorder 700

Figure 9:
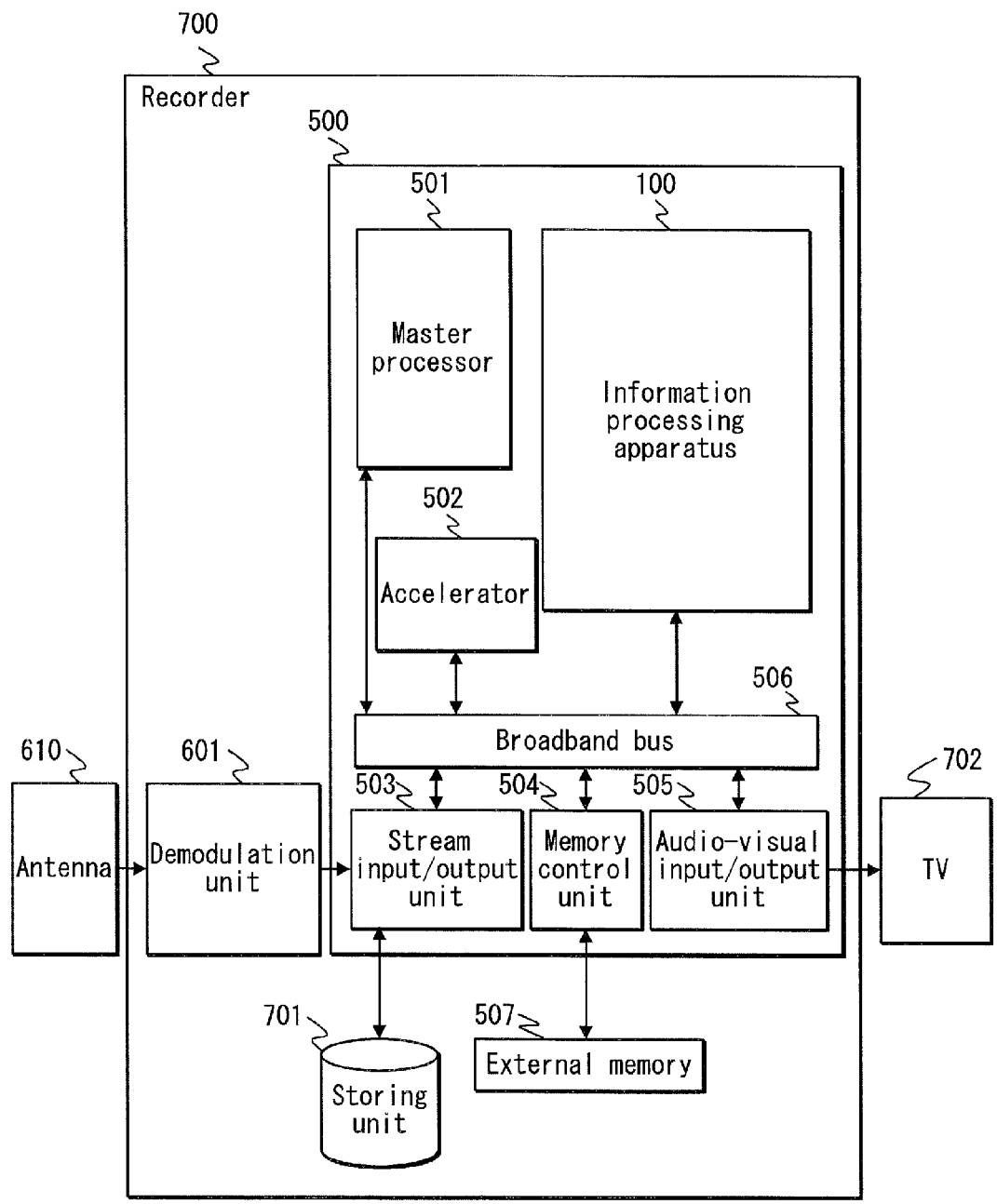
FIG. 9 is a block diagram illustrating a structure of a recorder 700 incorporating the information processing apparatus 100.

FIG. 9 illustrates a structure of a recorder 700 incorporating the above-described system LSI 500.

The recorder 700 includes: the system LSI 500, the external memory 507, the demodulation unit 601, and a storing unit 701.

Since explanation concerning the system LSI 500, the external memory 507, and the demodulation unit 601 has already been provided in the above, description thereof is omitted in the following.

The storing unit 701 has an area for storing received streams, and the received streams are stored to the storing unit 701 via the stream input/output unit 503. Note that here, at the point where the received streams are stored to the storing unit 701, data included in the received streams remain undecoded.

When performing playback of a stream (a broadcast program) stored in the storing unit 701, the system LSI 500 reads out the stream by using the stream input/output unit 503, decodes the encoded images included in the stream by performing the above-mentioned processing, and outputs the decoded images to the television 702, which is an external device connected with the recorder 700.

As such, by applying the above-mentioned system LSI 500 to the recorder 700, processing during playback of images recorded thereto is performed with an enhanced level of concurrency and efficiency.

2.4 Digital Camera 800

Figure 10:
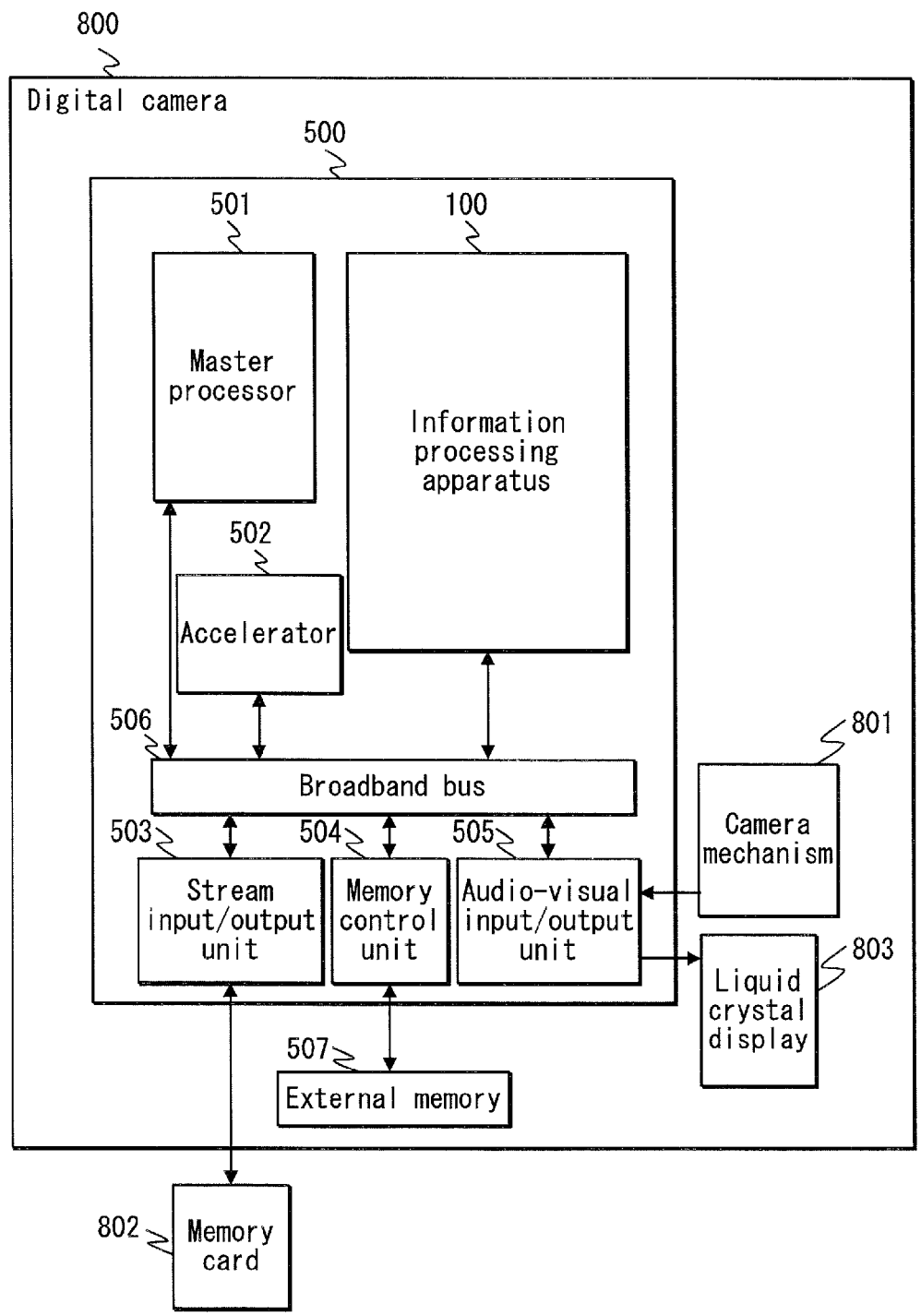
FIG. 10 is a block diagram illustrating a structure of a digital camera 800 incorporating the information processing apparatus 100.

FIG. 10 illustrates a structure of a digital camera 800 incorporating the above-described system LSI 500.

The digital camera 800 includes: the system LSI 500; the external memory 507, a camera mechanism 801; and a liquid crystal display 803. Further, a memory card 802 can be attached to or detached from the digital camera 800.

Since explanation concerning the system LSI 500 and the external memory 507 has already been provided in the above, description thereof is omitted in the following.

The camera mechanism 801 includes a lens, a shutter, and etc., and has a function of photographing a still image of a photographic subject appearing in the lens.

The liquid crystal display 803 displays image data having been produced as a result of the photographing.

The system LSI 500, during the photographing of a photographic subject, receives image data produced by the camera mechanism 801 by using the audio-visual input/output unit 505, and performs processing concerning the encoding of the image data by using the information processing apparatus 100. Subsequently, the system LSI 500 writes the encoded image data to the memory card 802 via the stream input/output unit 503.

When displaying the image data which has been produced as a result of the photographing, the system LSI 500 reads out the image data recorded on the memory card 802 by using the stream input/output unit 503, and performs processing concerning the decoding of the image data by using the information processing apparatus 100. Subsequently, the decoded image data is output to the liquid crystal display 803 via the audio-visual input/output unit 505.

Note that, description on the digital camera is provided merely as one example of a device incorporating the LSI 500, and the LSI 500 may be applied to various other devices. For instance, the system LSI 500 may by incorporated in a digital video camera. In such a case, it should be noted that a camera mechanism provided to a digital video camera differs to the camera mechanism provided to the digital camera. More specifically, it has been mentioned in the above-provided description on the digital camera that the camera mechanism is provided with a function of photographing still images. However, in the case of a digital video camera, the camera mechanism is provided with a function of recording moving images. However, similarly as in the above-described case, the information processing apparatus 100, even when incorporated in a digital video camera, performs processing concerning encoding of image data during the recording of moving images, and performs processing concerning the decoding of image data during the playback of the moving images.

Further, note that in each of the digital camera and the digital video camera, the camera mechanism may be provided with both functions of photographing still images and recording moving images.

As such, by applying the above-mentioned system LSI 500 to the digital camera 800, image processing during the photographing of images and the playback of images is performed with an enhanced level of concurrency and efficiency.

2.5 Mobile Telephone 900

Figure 11:
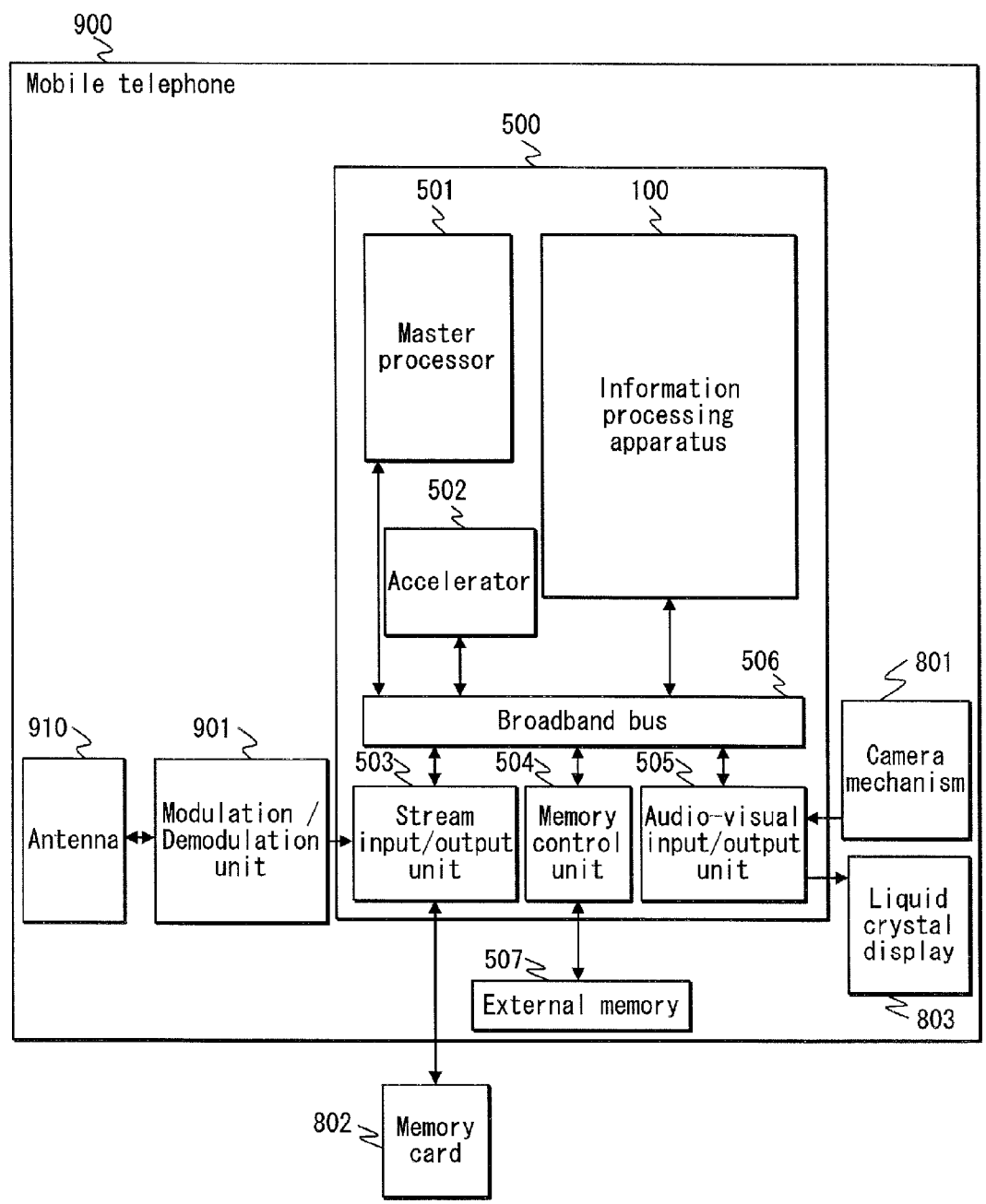
FIG. 11 is a block diagram illustrating a structure of a mobile telephone 900 incorporating the information processing apparatus 100.

FIG. 11 illustrates a structure of a mobile telephone 900 incorporating the above-described system LSI 500.

The mobile telephone 900 includes: the system LSI 500; the external memory 507; the camera mechanism 801; the liquid crystal display 803; a modulation/demodulation unit 901; and an antenna 910. Further, the memory card 802 can be attached to or detached from the mobile telephone 900.

Since explanation concerning the system LSI 500, the external memory 507, the camera mechanism 801, and the liquid crystal display 803 has already been provided in the above, description thereof is omitted in the following.

The antenna 910 transmits and receives data.

The modulation/demodulation unit 901 has a function of demodulating data (signals) received by the antenna 910 and a function of modulating data (signals) received from the system LSI 500. For instance, when receiving image data (streams) from the outside via the antenna 910, the modulation/demodulation unit 901 demodulates the stream signals and outputs the demodulated stream signals to the stream input/output unit 503 of the system LSI 500. Further, when receiving image data (streams) from the stream input/output unit 503, the modulation/demodulation unit 901 modulates the received data and outputs the modulated data to the outside via the antenna 910.

As such, by applying the above-mentioned system LSI 500 to the mobile telephone 900, image processing during the photographing of images and the playback of images is performed with an enhanced level of concurrency and efficiency. Here, note that the photographing of images, as well as the playback of images, is performed by the camera mechanism 801 of the mobile telephone 900. In addition, even in cases where image data are externally received, the mobile telephone 900 is able to perform image processing of the received image data with an enhanced level of concurrency and efficiency by incorporating the system LSI 500.

As description has been made in the above, the information processing apparatus 100 can be applied to a system LSI which performs video codec processing and image processing. For TVs, mobile telephones and the like, such processing performed by the system LSI is essential.

3. Modifications

Although description has been provided in the above on the present invention with reference to an actual embodiment thereof, the present invention is not limited to such an embodiment, and various changes and modifications are construed as being included in the scope of the present invention. For the sake of example, several modifications are described in the following.

(1) In embodiment 1, description is made that three instruction memories and four processor elements are provided to the information processing apparatus. However, the present invention is not limited to this.

The number of instruction memories and processor elements provided to the information processing apparatus may be altered, given that: the number of processor elements provided is at least n+1 when the number of instruction memories provided is n.

Note that, in a case where only one instruction memory is provided while there exist multiple processor elements, the SIMD program and the multiple MIMD programs are to be collectively included in the single instruction memory.

(2) Each of the blocks included in each of the information processing apparatuses pertaining to the embodiment and modifications of the present invention may be typically implemented as an LSI (Large Scale Integration), which is a type of integrated circuit. Further, each of the circuits may be separately integrated into a single chip, or the functions may be integrated into a single chip including a part or all of the circuits. Although description has been made on the basis of an LSI in the above, the name of the integrated circuit may differ according to the degree of integration of the chips. Other integrated circuits include an IC, a system LSI, a super LSI, and an ultra LSI.

Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI, reconfiguration of which could be made to the connection of internal circuit cells and settings. Further in addition, if a new technology of circuit integration replacing that of the LSI emerges as a result of the progress made in the field of semiconductor technology or another technology deriving therefrom, the integration of function blocks may be performed applying such technology. At this point, there is a possibility of biotechnology being applied to induce the future development of circuit integration technology.

(3) The present invention may be a combination of the embodiment and the modifications described in the above.

4. Supplementary Explanation (1) One aspect of the present invention is an information processing apparatus comprising: a plurality of processor elements; an instruction memory storing a first program and a second program; and an arbiter interposed between the processor elements and the instruction memory, the arbiter receiving, from each of the processor elements, a request for an instruction, from among instructions included in the first program and the second program, and controlling access to the instruction memory by the processor elements, wherein the arbiter arbitrates requests made by the processor elements when the requests are (i) simultaneous requests for different instructions included in one of the first program and the second program or (ii) simultaneous requests for an instruction included in the first program and an instruction included in the second program, and when two or more of the processor elements simultaneously request a same instruction included in one of the first program and the second program, the arbiter, when judging that the instruction memory is available to the two or more processor elements, outputs the same instruction to the two or more processor elements.

According to this, the first program and the second program are stored in a single instruction memory, and access control of the processor elements is performed by the arbiter. Hence, each of the multiple processor elements is able to access an execution target program, while there being no need to provide separate instruction memories storing each of the first program and the second program as in conventional technology.

(2) Here, the first program may be a SIMD program that includes an instruction for common processing to be executed by two or more processor elements, and the second program may be a MIMD program that includes instructions to be executed independently by different processor elements.

According to this, the information processing apparatus is able to execute the SIMD program and the MIMD program stored in the single instruction according to control performed by the arbiter. Hence, there is no need of switching between the SIMD program and the MIMD program as in conventional technology. In other words, the information processing apparatus executes the SIMD program and the MIMD program coexisting in the single instruction memory. In consequence, the area occupied by the instruction memory is reduced compared to when providing a separate instruction memory for each of the SIMD program and the MIMD program.

(3) Further, an arrangement may be made such that the information processing apparatus further comprises: another instruction memory that is different from the instruction memory, wherein the other instruction memory stores another MIMD program that is different from the MIMD program, and when receiving a request for an instruction included in the other MIMD program from at least one of the processor elements, the arbiter outputs the instruction to the at least one of the processor elements.

According to this, since the other instruction memory provided to the information processing apparatus stores the other MIMD program, the MIMD program and the other MIMD program can be executed in parallel according to control performed by the arbiter. Hence, even when both the SIMD program and the MIMD program coexist in the single instruction memory, the parallel execution of multiple MIMD processors is realized as in conventional technology by control performed by the arbiter.

(4) In addition, an arrangement may be made wherein, when the processor elements simultaneously request access to the SIMD program and the instruction for common processing has been executed by the processor elements, each of the processor elements requests access to one of the MIMD program, the other MIMD program, and the SIMD program, according to a type of processing to be subsequently executed thereby.

According to this, the processor elements execute respective types of processing after having executed the common processing according to the instruction included in the SIMD program. Hence, even when the SIMD program and the MIMD program coexist in the single instruction memory, the transition from the execution of the common processing by the processor elements to the execution of individual processing by each of the processor elements is realized as in conventional technology.

(5) Additionally, an arrangement may be made wherein the MIMD program is smaller in program size than the other MIMD program.

According to this, since the instruction memory stores therein the MIMD program having a smaller program size compared to the other MIMD program, the probability at which conflict takes place is suppressed compared to when the other MIMD program having a larger program size is stored in the instruction memory.

(6) Further, an arrangement may be made wherein the information processing apparatus performs processing of images, the instruction included in the SIMD program is for common processing to be applied to all of the images to be processed, and an instruction included in the MIMD program and an instruction included in the other MIMD program differ in terms of a type of images to be processed thereby.

According to this, the information processing apparatus is efficient when applied for the processing of images.

(7) In addition, the information processing apparatus may be incorporated in a digital television.

According to this, the information processing apparatus is efficient when applied for the processing of images in a digital television.

INDUSTRIAL APPLICABILITY

The information processing apparatus pertaining to the present invention has a structure where both an SIMD program and an MIMD program are stored on a single instruction memory, and thereby realizes a reduction of circuit size. Actual applications of the information processing apparatus pertaining to the present invention include digital video cameras and digital cameras, optical disc recorders, TVs, mobile telephones, and etc.

REFERENCE SIGNS LIST 100 information processing apparatus
101~103 first instruction memory-third instruction memory
104 communication network
105 arbiter
106-109 program counters (PCs)
111~114 first processor element (first PE)-fourth processor element (fourth PE)
115~118 data memories
131 bus
151~153 buses
154~157 output units
160a~160c address generating units
161a~161c address disagreement judging units
162a~162c access judging units
163a~163d wait signal generating units
164 select signal generating unit
165~168 buses

The invention claimed is:

1. An information processing apparatus comprising:
a plurality of processor elements;
an instruction memory storing a first program and a second program; and
an arbiter interposed between the processor elements and the instruction memory, the arbiter receiving, from each of the processor elements, a request for an instruction, from among instructions included in the first program and the second program, and controlling access to the instruction memory by the processor elements, wherein
the arbiter arbitrates requests made by the processor elements when the requests are (i) simultaneous requests for different instructions included in one of the first program and the second program or (ii) simultaneous requests for an instruction included in the first program and an instruction included in the second program, and
when two or more of the processor elements simultaneously request a same instruction included in one of the first program and the second program, the arbiter, when judging that the instruction memory is available to the two or more processor elements, outputs the same instruction to the two or more processor elements.

2. The information processing apparatus of claim 1, wherein
the first program is a SIMD program that includes an instruction for common processing to be executed by two or more processor elements, and
the second program is a MIMD program that includes instructions to be executed independently by different processor elements.

3. The information processing apparatus of claim 2, further comprising:
another instruction memory that is different from the instruction memory, wherein
the other instruction memory stores another MIMD program that is different from the MIMD program, and
when receiving a request for an instruction included in the other MIMD program from at least one of the processor elements, the arbiter outputs the instruction to the at least one of the processor elements.

4. The information processing apparatus of claim 3, wherein
when the processor elements simultaneously request access to the SIMD program and the instruction for common processing has been executed by the processor elements, each of the processor elements requests access to one of the MIMD program, the other MIMD program, and the SIMD program, according to a type of processing to be subsequently executed thereby.

5. The information processing apparatus of claim 4, wherein
the MIMD program is smaller in program size than the other MIMD program.

6. The information processing apparatus of claim 4, wherein
the information processing apparatus performs processing of images,
the instruction included in the SIMD program is for common processing to be applied to all of the images to be processed, and
an instruction included in the MIMD program and an instruction included in the other MIMD program differ in terms of a type of images to be processed thereby.

7. The information processing apparatus of claim 6, wherein
the information processing apparatus is to be incorporated in a digital television.

8. An integrated circuit comprising:
a plurality of processor elements;
an instruction memory storing a first program and a second program; and
an arbiter interposed between the processor elements and the instruction memory, the arbiter receiving, from each of the processor elements, a request for an instruction, from among instructions included in the first program and the second program, and controlling access to the instruction memory by the processor elements, wherein
the arbiter arbitrates requests made by the processor elements when the requests are (i) simultaneous requests for different instructions included in one of the first program and the second program or (ii) simultaneous requests for an instruction included in the first program and an instruction included in the second program, and
when two or more of the processor elements simultaneously request a same instruction included in one of the first program and the second program, the arbiter, when judging that the instruction memory is available to the two or more processor elements, outputs the same instruction to the two or more processor elements.

* * * * *